US012778068B2

(12) United States Patent
Qiu

(10) Patent No.: US 12,778,068 B2
(45) Date of Patent: Nov. 3, 2026

(54) LEAK-PROOF PEE PAD

(71) Applicant: JIANGSU ZHONGHENG PET ARTICLES JOINT-STOCK CO., LTD., Yancheng (CN)

(72) Inventor: Bin Qiu, Yancheng (CN)

(73) Assignee: JIANGSU ZHONGHENG PET ARTICLES JOINT-STOCK CO., LTD., Yancheng (CN)

( * ) Notice: Subject to any disclaimer, the term of this patent is extended or adjusted under 35 U.S.C. 154(b) by 0 days.

(21) Appl. No.: 19/011,715

(22) Filed: Jan. 7, 2025

(65) Prior Publication Data

US 2026/0114417 A1 Apr. 30, 2026

(30) Foreign Application Priority Data

Oct. 24, 2024 (CN) ........................ 202422577993.0

(51) Int. Cl.

| | |
|---|---|
| ***A01K 1/01*** | (2006.01) |
| ***B32B 21/02*** | (2006.01) |
| ***B32B 21/06*** | (2006.01) |

(52) U.S. Cl.

CPC ............ *A01K 1/0107* (2013.01); *B32B 21/02* (2013.01); *B32B 21/06* (2013.01); *B32B 2260/026* (2013.01); *B32B 2260/046* (2013.01); *B32B 2262/067* (2013.01); *B32B 2307/726* (2013.01); *B32B 2307/7265* (2013.01)

(58) Field of Classification Search

CPC ...... A01K 1/0107; B32B 21/02; B32B 21/06; B32B 2260/026; B32B 2260/046; B32B 2307/726; B32B 2307/7265; B62B 2262/067

See application file for complete search history.

(56) References Cited

U.S. PATENT DOCUMENTS

| | | | | |
|---|---|---|---|---|
| 6,566,578 | B1 * | 5/2003 | Glaug | A61F 13/53743 428/137 |
| 6,667,424 | B1 * | 12/2003 | Hamilton | A61F 13/53743 604/378 |
| 2013/0130017 | A1 * | 5/2013 | Takatori | C08F 2/32 252/194 |
| 2015/0320009 | A1 * | 11/2015 | Sasano | A01K 1/0157 119/161 |
| 2018/0229216 | A1 * | 8/2018 | Smith | A61F 13/5116 |
| 2018/0317445 | A1 * | 11/2018 | Hasegawa | B32B 3/04 |
| 2020/0107518 | A1 * | 4/2020 | Hiroshima | A01K 1/0107 |
| 2024/0207108 | A1 * | 6/2024 | Heege | B32B 9/02 |

* cited by examiner

*Primary Examiner* — Kimberly S Berona
*Assistant Examiner* — Katherine June Walter
(74) *Attorney, Agent, or Firm* — Bayramoglu Law Offices LLC

(57) ABSTRACT

A leak-proof pee pad includes: an impermeable layer; an absorbent layer provided on a surface of the impermeable layer; a permeable layer provided on a side of the absorbent layer away from the impermeable layer and including an edge fixedly connected to an edge of the impermeable layer, and a barrier layer provided inside the absorbent layer. The barrier layer is provided inside the absorbent layer to prevent urine from flowing to the ground, avoiding pollution to the environment.

1 Claim, 2 Drawing Sheets

LEAK-PROOF PEE PAD

CROSS REFERENCE TO THE RELATED APPLICATIONS

This application is based upon and claims priority to Chinese Patent Application No. 202422577993.0, filed on Oct. 24, 2024, the entire contents of which are incorporated herein by reference.

TECHNICAL FIELD

The present disclosure relates to the field of pet supplies, and in particular, to a leak-proof pee pad.

BACKGROUND

Pet pee pads are disposable sanitary products designed specifically for pet dogs or pet cats, and have extremely strong and safe water absorption capacity. A specially designed surface material is used in the pet pee pads to keep the pet pee pads dry for a long time, thereby maintaining household cleanliness and hygiene.

However, the edges of conventional pet pee pads are not hemmed. Therefore, when there is a lot of urine from a pet, the urine will flow out from the edge of a pee pad to affect environmental hygiene.

SUMMARY

In order to solve the technical problem that when there is a lot of urine from a pet, the urine is prone to flowing out from the edge of a pee pad to affect environmental hygiene, an objective of the present disclosure is to provide a leak-proof pee pad.

To achieve the above objective, an embodiment of the present disclosure provides a leak-proof pee pad. The leak-proof pee pad includes an impermeable layer; an absorbent layer, where the absorbent layer is provided on a surface of the impermeable layer; a permeable layer, where the permeable layer is provided on a side of the absorbent layer away from the impermeable layer and includes an edge fixedly connected to an edge of the impermeable layer; and a barrier layer, where the barrier layer is provided inside the absorbent layer.

The absorbent layer is provided on the surface of the impermeable layer, so that the absorbent layer is configured to absorb pet urine. The permeable layer is provided on the side of the absorbent layer away from the impermeable layer, so that the permeable layer fixes the position of the absorbent layer, and urine can pass through the permeable layer. The barrier layer is provided inside the absorbent layer, so that the barrier layer prevents urine from spreading towards the edge of the impermeable layer, and prevents urine from flowing to the ground and affecting environmental hygiene.

In addition, the leak-proof pee pad provided in the above embodiment of the present disclosure may have the following additional technical features.

In the above technical solution, the absorbent layer includes a first tissue paper layer, where the first tissue paper layer is provided between the impermeable layer and the permeable layer; a second tissue paper layer, where the second tissue paper layer is provided between the first tissue paper layer and the impermeable layer; and a wood pulp layer, where the wood pulp layer is provided between the first tissue paper layer and the second tissue paper layer.

The first tissue paper layer and the second tissue paper layer are provided, and the wood pulp layer is provided between the first tissue paper layer and the second tissue paper layer, so that the water absorption effect of the pee pad is improved.

In the above technical solution, the barrier layer is provided between the first tissue paper layer and the wood pulp layer, and the barrier layer has a hollow structure in a middle of the barrier layer.

The barrier layer is provided between the first tissue paper layer and the wood pulp layer, and the barrier layer has the hollow structure in the middle of the barrier layer, so that when urine enters the hollow structure in the barrier layer, the barrier layer prevents the urine from flowing towards the edge of the pee pad.

In the above technical solution, the wood pulp layer includes an absorbent resin inside the wood pulp layer.

The absorbent resin inside the wood pulp layer further improves the water absorption effect of the wood pulp layer.

Additional aspects and advantages of the present disclosure will become apparent in the following description or will be understood through the practice of the present disclosure.

BRIEF DESCRIPTION OF THE DRAWINGS

The above and/or additional aspects and advantages of the present disclosure will become apparent and readily comprehensible from the description of embodiments in conjunction with the following drawings, where.

Figure 1:
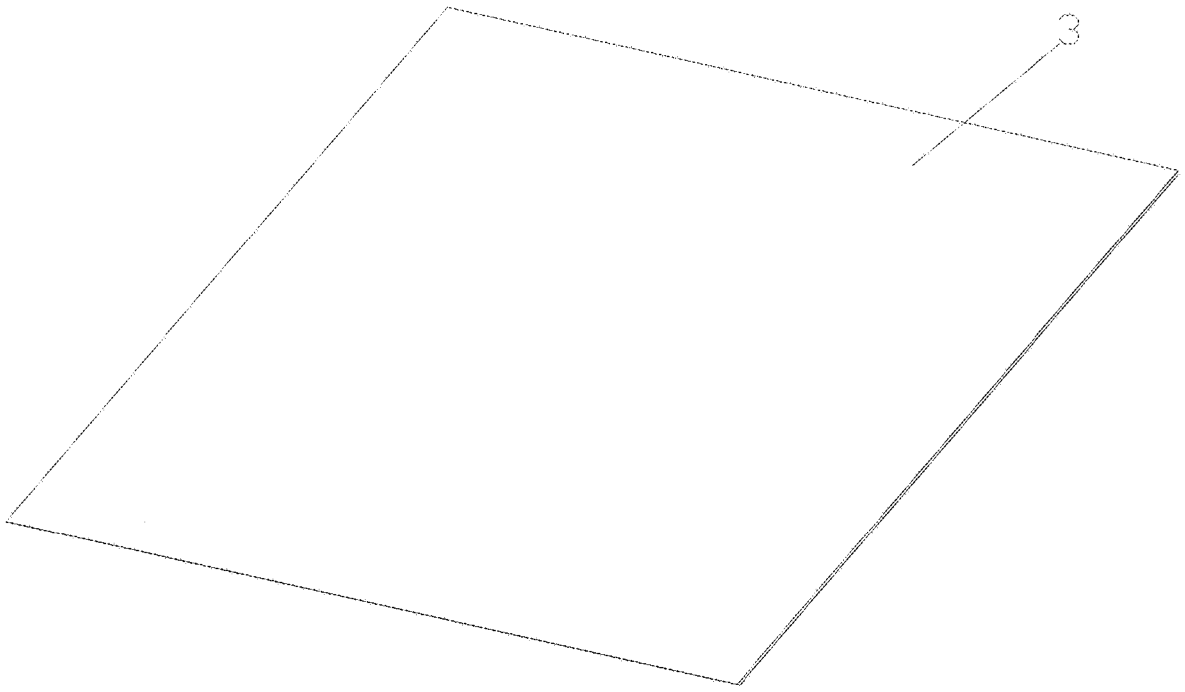
FIG. 1 is an overall structural schematic diagram of a leak-proof pee pad according to the present disclosure.
Figure 2:
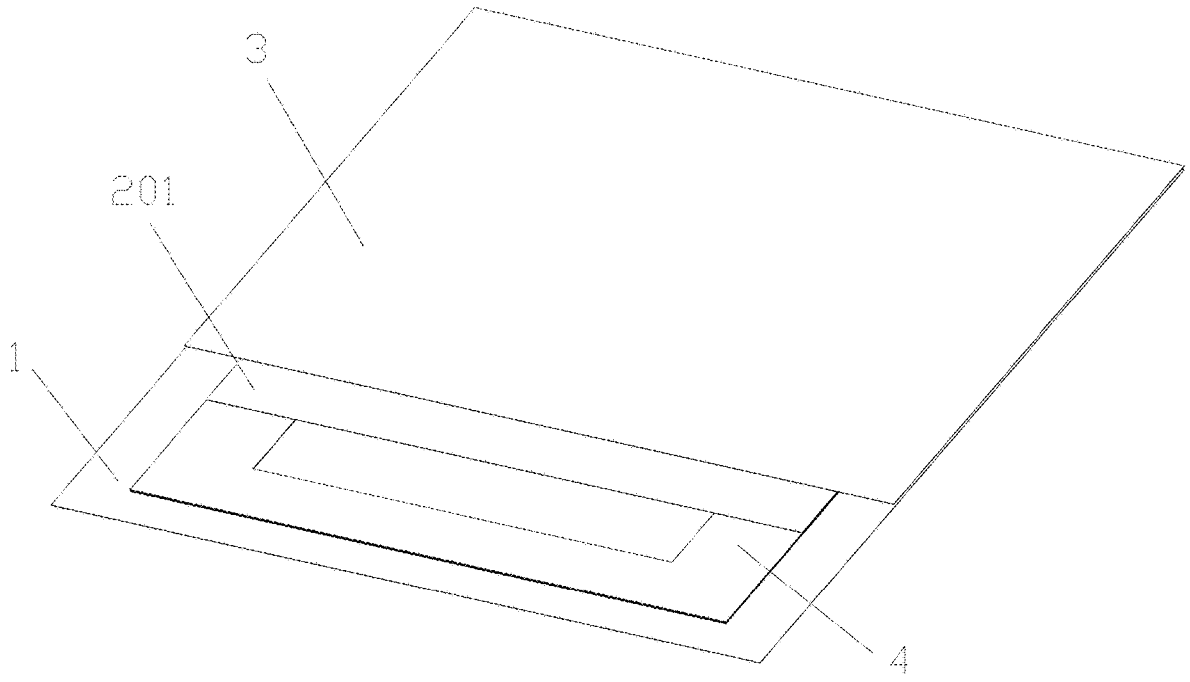
FIG. 2 is a partial sectional structural schematic diagram of a leak-proof pee pad according to the present disclosure.
Figure 3:
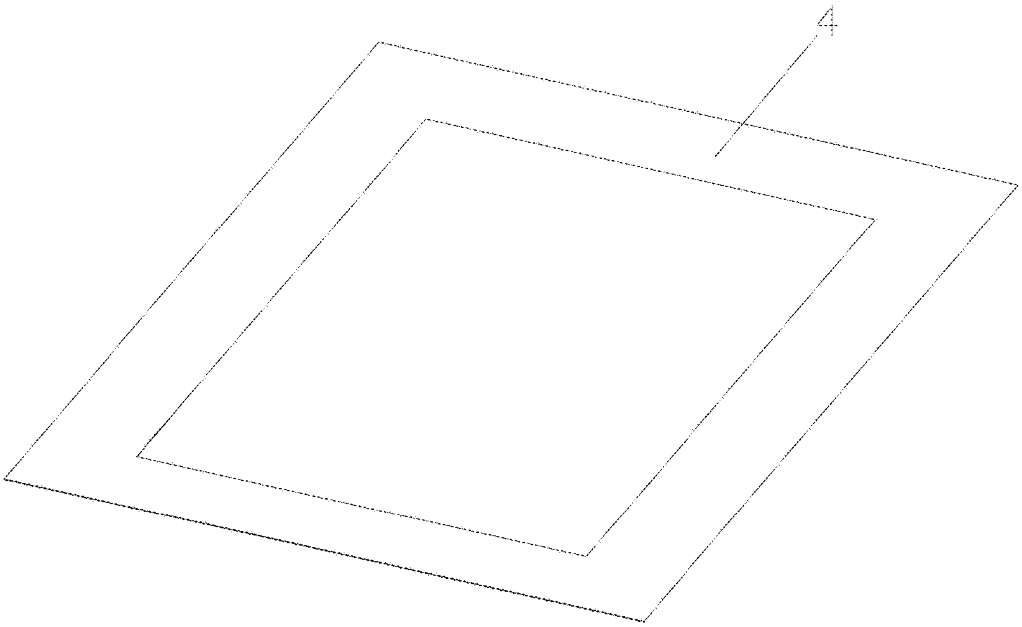
FIG. 3 is a structural schematic diagram of a barrier layer according to the present disclosure.
Figure 4:
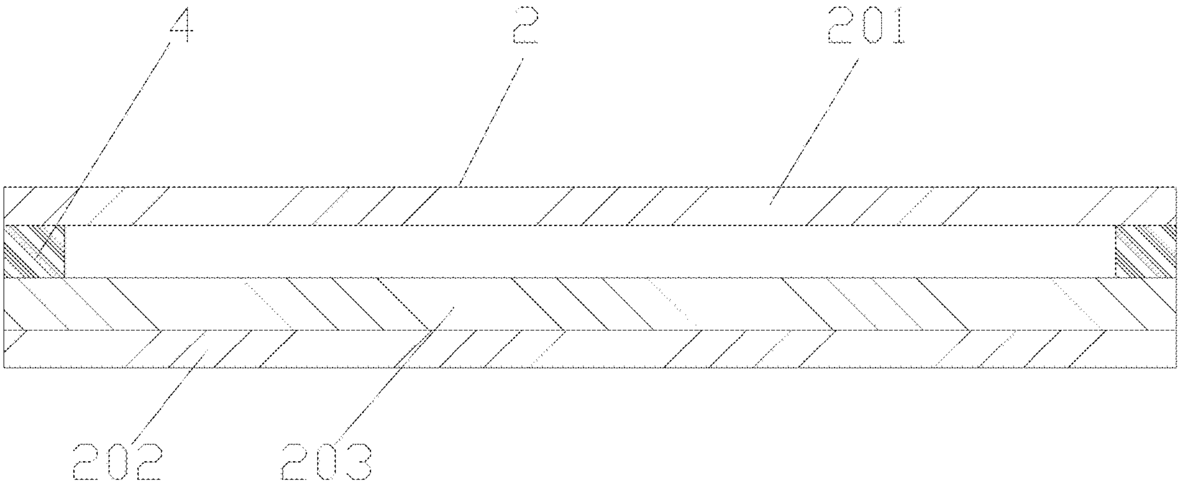
FIG. 4 is a sectional structural schematic diagram of an absorbent layer according to the present disclosure.

Reference numerals in FIGS. 1 to 4 are as follows:

1. impermeable layer; 2. absorbent layer; 201. first tissue paper layer; 202. second tissue paper layer; 203. wood pulp layer; 3. permeable layer; and 4. barrier layer.

DETAILED DESCRIPTION OF THE EMBODIMENTS

To understand the above objectives, features, and advantages of the present disclosure more clearly, the present disclosure is further described in detail below with reference to the drawings and specific implementations. It should be noted that the embodiments of the present disclosure and features of the embodiments may be combined with each other in case of no conflict.

Many specific details are set forth in the following description to facilitate a full understanding of the present disclosure. However, the present disclosure can also be implemented in other ways different from those described herein. Therefore, the protection scope of the present disclosure is not limited by the specific embodiments disclosed below. In order to solve the technical problem that when there is a lot of urine from a pet, the urine is prone to flowing out from the unwrapped edge of a pee pad to affect environmental hygiene, one objective of the present disclosure is to provide a leak-proof pee pad.

The leak-proof pee pad according to some embodiments of the present disclosure is described below with reference to FIGS. 1 to 4.

As shown in FIGS. 1 to 4, the leak-proof pee pad according to the embodiments of the present disclosure includes an impermeable layer 1, an absorbent layer 2, a permeable layer 3, and a barrier layer 4.

Specifically, the absorbent layer 2 is provided on a surface of the impermeable layer 1. The permeable layer 3 is provided on a side of the absorbent layer 2 away from the impermeable layer 1, and an edge of the permeable layer 3 is fixedly connected to an edge of the impermeable layer 1. The barrier layer 4 is provided inside the absorbent layer 2.

The absorbent layer 2 includes a first tissue paper layer 201 provided between the impermeable layer 1 and the permeable layer 3; a second tissue paper layer 202 provided between the first tissue paper layer 201 and the impermeable layer 1; and a wood pulp layer 203 provided between the first tissue paper layer 201 and the second tissue paper layer 202.

The barrier layer 4 is provided between the first tissue paper layer 201 and the wood pulp layer 203, and the barrier layer 4 has a hollow structure in a middle of the barrier layer 4.

When a pet uses the pee pad, its urine first passes through the permeable layer 3 provided on the side of the absorbent layer 2 away from the impermeable layer 1. The shape and size of the permeable layer 3 are the same as those of the impermeable layer 1, and the edge of the permeable layer 3 is fixedly connected to the corresponding edge of the impermeable layer 1. The permeable layer 3 is made of non-woven fabric, ensuring the passage of urine. The absorbent layer 2 is provided between the permeable layer 3 and the impermeable layer 1. The absorbent layer 2 includes the first tissue paper layer 201 provided between the impermeable layer 1 and the permeable layer 3, the second tissue paper layer 202 provided between the first tissue paper layer 201 and the impermeable layer 1, and the wood pulp layer 203 provided between the first tissue paper layer 201 and the second tissue paper layer 202. The first tissue paper layer 201, the second tissue paper layer 202, and the wood pulp layer 203 are configured to absorb urine. The barrier layer 4 is provided between the first tissue paper layer 201 and the wood pulp layer 203. The barrier layer 4 has the hollow structure in the middle of the barrier layer 4. Therefore, when urine enters the absorbent layer 2, the urine is located in the hollow structure in the middle of the barrier layer 4. The barrier layer 4 is recessed in the middle and raised at four edges, such that the urine remains in the hollow structure of the barrier layer 4. The four edges of the barrier layer 4 prevent the urine from flowing towards the edge of the impermeable layer 1, thereby avoiding the urine from flowing towards the ground and reducing environmental pollution.

The wood pulp layer 203 includes an absorbent resin inside the wood pulp layer 203.

The absorbent resin inside the wood pulp layer 203 has strong water absorption capability, further improving the water absorption effect of the wood pulp layer 203.

It should be noted that the first tissue paper layer 201, the second tissue paper layer 202, the wood pulp layer 203, and the barrier layer 4 are identical in terms of shape and size, and the barrier layer 4 is made of the same material as the wood pulp layer 203.

The present disclosure has the following advantages.

The barrier layer 4 is provided inside the absorbent layer 2, and the barrier layer 4 prevents urine from flowing to the ground, thereby avoiding pollution to the environment.

In the present disclosure, the terms such as "provided", "connected to", "connected", and "fixed" should be comprehended in a broad sense. For example, "connected" may be comprehended as fixedly connected, detachably connected, or integrally connected, and "connected to" may be directly connected to or indirectly connected to through an intermediary. Those of ordinary skill in the art may understand the specific meanings of the above terms in the present disclosure based on specific situations.

In the description of the present disclosure, it should be understood that orientation or position relationships indicated by terms such as "inside" and "outside" are orientation or position relationships shown in the drawings, and these terms are just used to facilitate description of the present disclosure and simplify the description, but not to indicate or imply that the mentioned apparatus or elements must have a specific orientation and must be constructed and operated in a specific orientation, and thus, these terms cannot be understood as a limitation to the present disclosure.

In the description of this specification, the description with reference to the terms such as "one embodiment", "some embodiments", and "a specific embodiment" means that the specific features, structures, materials, or characteristics described with reference to the embodiment or example are included in at least one embodiment or example of the present disclosure. In this specification, the schematic descriptions of the above terms do not necessarily refer to the same embodiment or example. Moreover, the specific features, structures, materials, or characteristics described may be combined in any suitable way in any one or more embodiments or examples.

The above are merely preferred embodiments of the present disclosure, and are not intended to limit the present disclosure, and various changes and modifications can be made by those skilled in the art to the present disclosure. Any modifications, equivalent substitutions, improvements, etc. made within the spirit and principle of the present disclosure should be included in the protection scope of the present disclosure.

What is claimed is:

1. A leak-proof pee pad for pets, comprising:

an impermeable layer;

an absorbent layer, wherein the absorbent layer is provided on a surface of the impermeable layer, and the absorbent layer comprises a first tissue paper layer, a second tissue paper layer, and a wood pulp layer provided between the first tissue paper layer and the second tissue paper layer;

a permeable layer, wherein the permeable layer is provided on a side of the absorbent layer away from the impermeable layer, and an edge of the permeable layer is fixedly connected to an edge of the impermeable layer, wherein the permeable layer is made of non-woven fabric;

a barrier layer, wherein the barrier layer is provided inside the absorbent layer, the barrier layer is provided between the first tissue paper layer and the wood pulp layer, the barrier layer comprises a hollow space in a middle region of the barrier layer, the hollow space is an opening extending through the barrier layer, wherein the hollow space is devoid of material within an interior boundary of the barrier layer, and the barrier layer comprises four edge portions surrounding the opening, and the barrier layer is made of the same material as the wood pulp layer;

wherein outer perimeters of the first tissue paper layer, the second tissue paper layer, the wood pulp layer, and the barrier layer are identical in shape and size;

wherein the wood pulp layer comprises an absorbent resin inside the wood pulp layer;

and wherein, when urine enters the absorbent layer, the urine remains in the hollow space of the barrier layer and the barrier layer prevents the urine from flowing towards the edge of the impermeable layer.

* * * * *